United States Patent
Li et al.

(10) Patent No.: US 7,765,142 B2
(45) Date of Patent: Jul. 27, 2010

(54) APPARATUS AND METHODS FOR MEASURING MULTIMEDIA DEMAND AND FOR MAXIMIZING BROADCAST CHANNEL UTILIZATION

(75) Inventors: Jun Li, Plainsboro, NJ (US); Kumar Ramaswamy, Plainsboro, NJ (US); Guillaume Bichot, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1612 days.

(21) Appl. No.: 10/107,292

(22) Filed: Mar. 26, 2002

(65) Prior Publication Data

US 2003/0065611 A1    Apr. 3, 2003

(51) Int. Cl.
*G06Q 40/00* (2006.01)
(52) U.S. Cl. ......................................................... 705/37
(58) Field of Classification Search .................... 705/35, 705/37, 39; 725/1, 5, 8, 64, 87, 104
See application file for complete search history.

(56) References Cited

U.S. PATENT DOCUMENTS

| | | | | | |
|---|---|---|---|---|---|
| 5,245,420 | A | * | 9/1993 | Harney et al. ................ | 725/104 |
| 5,291,554 | A | * | 3/1994 | Morales ....................... | 380/211 |
| 5,311,325 | A | * | 5/1994 | Edwards et al. ................ | 725/8 |
| 5,505,901 | A | * | 4/1996 | Harney et al. .................. | 725/4 |
| 5,604,528 | A | * | 2/1997 | Edwards et al. ................ | 725/25 |
| 5,914,712 | A | * | 6/1999 | Sartain et al. ................... | 725/9 |
| 6,130,898 | A | * | 10/2000 | Kostreski et al. ............. | 370/522 |
| 6,199,050 | B1 | * | 3/2001 | Alaia et al. .................... | 705/37 |
| 6,366,891 | B1 | * | 4/2002 | Feinberg ....................... | 705/37 |
| 6,816,841 | B1 | * | 11/2004 | Suginuma ..................... | 705/52 |
| 6,985,885 | B1 | * | 1/2006 | Goldberg et al. .............. | 705/37 |
| 7,133,837 | B1 | * | 11/2006 | Barnes, Jr. .................... | 705/26 |
| 2001/0014868 | A1 | * | 8/2001 | Herz et al. ..................... | 705/14 |
| 2001/0042002 | A1 | * | 11/2001 | Koopersmith ................ | 705/10 |

OTHER PUBLICATIONS

Rushe et al. Freeserve Ponders Bid to Show Live Football on the net. Sunday Times. London (UK): Feb. 13, 2000. p. 1.*
Business Editors. VertigoXmedia Partners with Pinnacle Systems to Streamline Contet Automation. Business Wire. New York: Apr. 20, 2001. p. 1.*
Business/Technology Editors NCTA Cable 2000. Web-Enabled Interactive Television: Will Consumers Subscribe? Study Reveals That Consumers Want Familiar Internet Applications From Cable Service Providers. Business Wire. New York: May 10, 2000. p. 1.*
Wilson, Neil. ITV holds key as 2bn righs war reaches D-Day. Daily Mail. London (UK): May 10, 2000. p. 95.*

* cited by examiner

*Primary Examiner*—Hani Kazimi
*Assistant Examiner*—Muriel Tinkler
(74) *Attorney, Agent, or Firm*—Robert D. Shedd; Harvey D. Fried; Joel M. Fogelson

(57) ABSTRACT

The present invention provides apparatus and methods for measuring multimedia demand and for maximizing broadcast channel utilization. A first, two way communications channel or channels, from a customer to a broadcaster are provided, as well as a second broadcast channel, which may be, in some embodiments, combined with the two way channel. A bid cycle is established for available programs, whereby one or more programs is listed as available on said two way channel, whereupon one or more customers may bid on those programs in order to view those programs. If the aggregated bids reached a threshold value, the broadcaster will then broadcast the program to the bidding customers, thus closing the bid cycle. If the threshold is not reached, the bid cycle is unsatisfied.

8 Claims, 2 Drawing Sheets

| Program Type | Program Name | Offer price (min) | Bid price | Expires day;date;time | Current fulfillment | Predicted Download day;date;time | Preview Available? |
|---|---|---|---|---|---|---|---|
| Movie | Pearl Harbor | $2.50 | | Thursday; 2/20; 6 pm | 50% | Thursday; 2/20; 6 p.m. | YES |
| Sports | NBA 76ers. V. Lakers | $5.00 | | Today; 2/19; 6 p.m. | 50% | Today; 2/19; 6 p.m. | NO |
| Music | Fall Concert at NYC | $2.00 | | Friday; 2/21; 1 p.m. | 80% | Thursday; 2/20; 12 p.m. | NO |

TABLE I

APPARATUS AND METHODS FOR MEASURING MULTIMEDIA DEMAND AND FOR MAXIMIZING BROADCAST CHANNEL UTILIZATION

FIELD OF THE INVENTION

The present invention relates to multimedia broadcasting. More particularly, the present invention relates to pay per view multimedia broadcasting.

BACKGROUND OF THE INVENTION

The multimedia broadcaster is commonly faced with two problems when marketing its programs. The first problem is effectively measuring customer demand for multimedia broadcasts. The second problem is effectively utilizing bandwidth to deliver multimedia broadcasts.

There is no simple solution to the first problem because measuring customer demand for multimedia broadcasts, such as television programs, is difficult to do with any degree of precision. For example, past successful and unsuccessful programs may be used by the broadcaster as a guideline for what will be successful, but recycling past programs may lead as equally to failure as to success.

Effectively measuring customer demand for pay per view broadcasts (which term as used herein includes Video on Demand broadcasts) is at least as difficult as measuring demand for free content. Additionally, the broadcaster may incur a certain amount of risk with pay per view programming. This risk may be incurred because pay per view content needs to be attractive enough for customers to be willing to pay for the content. Thus, the broadcaster may need to invest larger sums to develop pay per view content than it would invest to develop free content, and so incur greater risk in developing pay per view content than in developing free content.

In order to attempt to effectively measure customer demand for pay per view, and to minimize the risk in developing pay per view programming, the pay per view broadcaster may attempt to determine what programming will be attractive to customers in a number of ways. For example, as with free broadcasts, the pay per view broadcaster may attempt to develop and present works with content that has previously been shown to be desired by customers. The pay per view broadcaster might also attempt to analyze historical consumer subscription data and build a statistical model to predict customer demand for future programming.

Neither the content based model nor statistical data model method, however, is especially effective in measuring customer demand and minimizing risk. Neither model is effectively able to establish, before providing a program, customer demand for the program with any degree of precision. For example, the statistical model may fail to include customer consumption of free content in its model, thus excluding data that would assist in constructing the model.

Broadcasters may attempt to combine both models to improve the accuracy of any method used, however, even with a combination of both models, limitations remain. For example, as long as any such models depend upon historical data they may "miss the mark" because the models use that historical data to predict future performance. For example, since the historical data was collected, customer tastes may have changed, the market may have been saturated with a particular type of product, etc., and so the historical data would not serve as an accurate predictor of future performance.

Thus the pay per view broadcaster is often faced with a dilemma. The broadcaster needs to develop content and devote its broadcast resources to the dissemination of the content, yet the broadcaster also needs to be assured of some rate of return on the programs it is developing and broadcasting. Presently, the art lacks a simple, effective, resolution of that dilemma.

Complicating matters even further is the evolving nature of broadcast technology. For example, presently in-home television technology is primarily comprised of analog systems, with passive analog receptors (e.g., television receivers) and analog storage capabilities (e.g., video cassette recorders.) However, digital technology will likely begin to assume increasing importance in the area of in-home television technology. Digital technology, with its greater ability to deliver content, may increase the broadcaster's dilemma. The broadcaster needs to deliver more content because it has more channels to fill and so it needs to develop more content and devote more resources to the delivery of the content. Yet, that greater investment in content for multiple channels might lead to a greater amount of risk than content for a single channel, because the broadcaster has devoted more resources to multiple show development. Indeed, if the broadcaster repeatedly generates multiple shows for those multiple channels without accurately gauging consumer demand, it may well cease operating after a period of time.

The problem of measuring customer demand and minimizing risk is, as was noted above, only one problem the multimedia broadcaster faces. The second problem is effectively utilizing bandwidth to deliver multimedia broadcasts.

Effectively utilizing bandwidth to deliver multimedia broadcasts is a problem because channels are limited, even in a digital technology delivery environment. Maximizing each channel means ensuring the content delivered through the channel is the most desirable and appropriate content for the customer.

Of course, this problem is related to the first problem, that of measuring customer demand. If customer demand is properly measured, it is more likely than not that the bandwidth is effectively utilized. Still, effective utilization and maximal utilization may be different. For example, content may be attractive enough to reach a baseline audience, yet that content may not be the most effective in attracting the maximal audience. Given the limited scope of channels or delivery systems, it would be in the broadcaster's best interest to use each channel to attract the maximal audience for the content being broadcast on that channel.

The art to date primarily uses the mechanisms described above, that is, those that attempted to measure customer demand, to attempt to maximize content. Yet, as noted above, the industry would benefit from a more precise measurement system in its attempt to maximize utilization of its limited delivery systems.

SUMMARY OF THE INVENTION

The present invention provides apparatus and methods for measuring multimedia demand and for maximizing broadcast channel utilization. The preferred embodiments comprise a two way communications channel or channels, from the customer to the broadcaster, as well as a second broadcast channel, which may be, in some embodiments, combined with the two way channel.

A bid cycle, according to the preferred embodiments, begins when the broadcaster notifies customers of programs that are available, as well as in development or contemplated for development. The broadcaster provides an estimated end time for the collection of bids. Customers, in response, bid on the program during a bidding process. The broadcaster may choose to shorten or extend the estimated end time as a result of the bidding process, for example, the broadcaster may choose to extend the estimated end time if the bidding process proceeds slowly. The broadcaster aggregates the bids as they are received and compares the bids to a threshold value, in order to determine if the aggregated value of the bids are at least equal to the threshold value.

Once the aggregated value of the bids reaches the threshold value, the broadcaster stops collecting bids and broadcasts the program to the bidding customers. This satisfies the bid cycle, and the customers are billed for the program according to their bid price. In some preferred embodiments, a bid cycle might then begin again. If the threshold is not reached, the bid cycle is unsatisfied.

In the especially preferred embodiments, the customer accesses a broadcaster's database of programs through various means, e.g., interactive television, Internet, etc. In the database is a listing of multimedia programs, which can be reviewed by the customer, as well as a suggested minimum bid and an estimated ending time for the bid cycle.

Where the customer has connections with sufficient bandwidth, customers can search and preview the programs, if a preview is available. The customer then selects one or more of the programs, and provides a bid, or price she is willing to pay for the program.

The broadcaster may, in certain embodiments, modify the provided estimated ending time, such as when the ending time is approaching. In such an event, the broadcaster can provide further notice to bidding customers, such as that the estimated ending time has been extended, that the broadcast time is now certain, etc.

The system records the customer's bid, and aggregates the bid with others received for the same program. If all the aggregate bids reach a threshold value determined by the broadcaster, using various factors (such as prime time broadcast slots for the program, recovery of program cost; sufficient revenue will be received for the program to justify devoting resources to its download; etc.,) the broadcaster stops collecting bids and broadcasts the program for download to a bidding customer's local storage means. The customer's account is then charged the bid price and the program unlocked from storage, so the customer may watch it when desired.

The broadcaster then will set a broadcasting time and provide notice to the customers of that time (assuming that the embodiment is not one to have provided a broadcast time to the customer already, as noted above.) If customers have successfully bid that do not have local storage means, the notice time should provide ample notice, before the broadcasting time, for the customer to watch the broadcast.

Additionally, the broadcaster can continue to collect requests for the program, up until the broadcast time, from non bidding customers under a pay per view scheme, that is, providing notice to those customers that a certain program will be broadcast at a certain time for a set price determined by the broadcaster.

Completion of bid collection satisfies the bid cycle, and the customers are billed for the program. Billing can be according to the customer's bid price, or, in alternate preferred embodiments, a new price can be set and billed based upon various criteria, e.g. maximizing broadcaster profit, etc.

In some preferred embodiments, a bid cycle might then begin again. If the threshold is not reached, the bid cycle is unsatisfied, unless, as noted above, the bid cycle has an extended estimated ending time.

Thus customer demands for programming can be established dynamically, through their choice of programs on which to bid, and so bandwidth can be assigned dynamically, according to the level of customer demand for any particular program. Those programs that have sufficient demand will be assigned a communications channel. Moreover, the channel can be utilized maximally, by only broadcasting that content which has been essentially "preapproved" by customers, that is, that customers have successfully bid upon. The preapproval process can be refined by the broadcaster to maximize placement of especially desired programs, for example, those programs generating the maximum revenue can be provided in an accelerated fashion, can be given primary placement on the listings, etc.

Various embodiments of the present invention provide apparatus and methods for measuring multimedia broadcast demand by establishing near contemporaneous measures of demand for multimedia products, as well as maximizing broadcast channel utilization. Additionally, various embodiments provide apparatus and methods for providing simple, efficient pay per view delivery. Additional advantages and novel features of the invention will be set forth in part in the description and figures which follow, and in part will become apparent to those skilled in the art on examination of the following, or may be learned by practice of the invention.

DETAILED DESCRIPTION OF THE PREFERRED EMBODIMENTS

Figure 1:
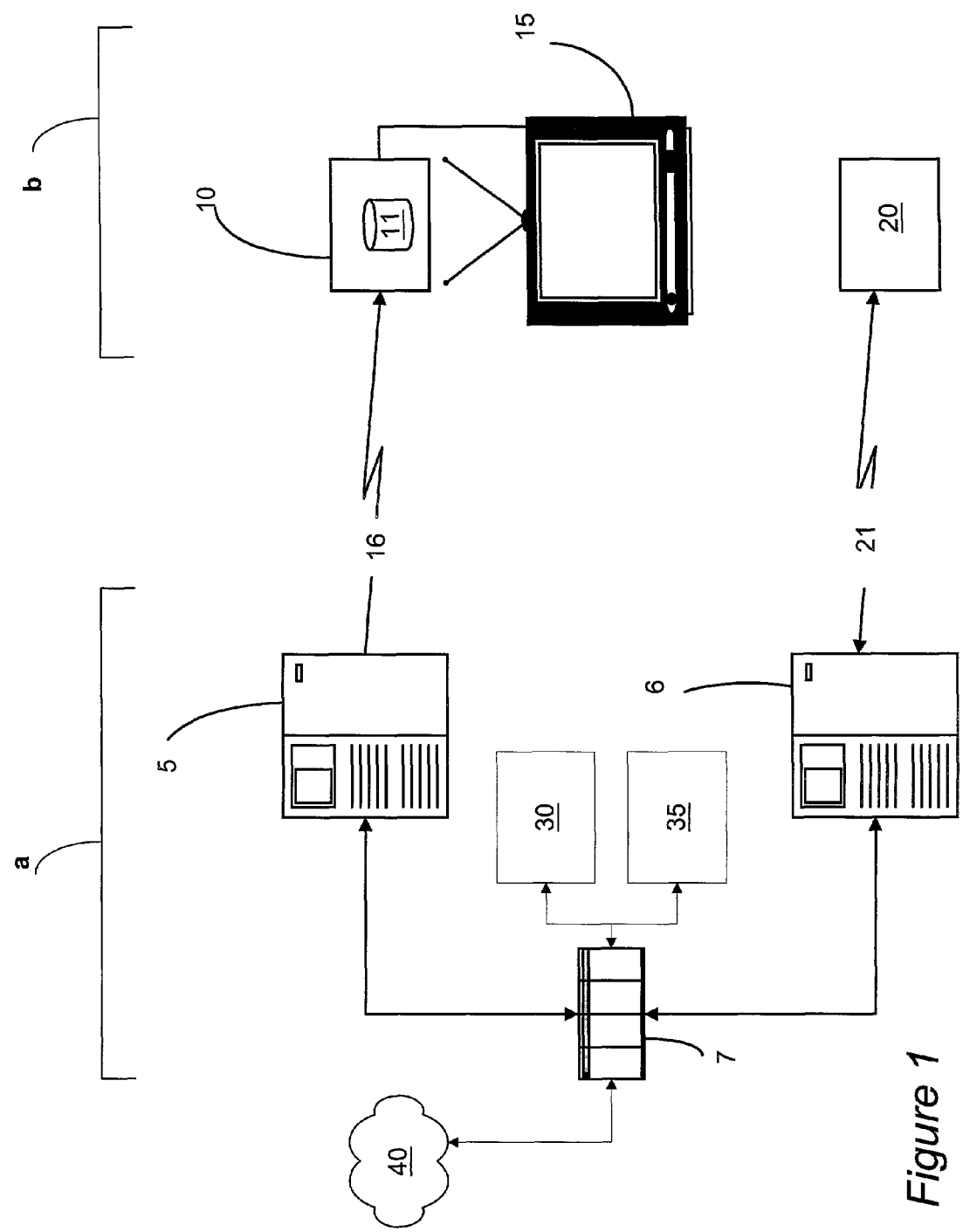
FIG. 1 shows a preferred embodiment.
Table 1 shows a preferred embodiment.

FIG. 1 shows a preferred embodiment of the present invention used in a television programming media.

Shown generally at a is the broadcaster's side of this embodiment and shown generally at b is the customer's or client's side of this embodiment. Turning first to the area designated at a, a video server 5 is seen as well as a web server 6. Each of these communicate as well with host 7. Host 7 may have other connections as well. For example, billing system 30 is linked to the host 7, as is processing system 35. Each of these will be described in further detail below.

Media distribution network 40, providing connections between programming creators and broadcasters is also shown linked to host 7. This connection to media distribution network 40 provides distribution means for programming to the video server 5 as is known in the art. In the especially preferred embodiments, video server 5 and web server 6 are synchronized by host 7 to ensure the same video content is available on both. This synchronization ensures the customer can preview the content from web server 6 as it exists on video server 5.

It should also be noted that alternate embodiments may have a different arrangement of servers and host. For example, a web server may be combined with a video server on the same system. In such an embodiment, both may draw from the same video database. Other embodiments may as well have a server or servers provided by an intermediary of the broadcaster. Those embodiments are specifically intended to be included herein, and any intermediary of a broadcaster is intended to be understood as being within the scope of the word "broadcaster," as that word is used herein. Moreover, the scope of the word "broadcaster" as that word is used herein, also includes more than one entity, so that, for example, a broadcaster may include a content provider, an entity responsible for providing programs over channels, etc. That is, if in certain embodiments, one or more entities are responsible for providing a single program to a customer, as might be the situation when a first content provider determines demand for a program in order to decide whether to make available a program, whether by creation of the program or otherwise, and a second entity determines broadcast dates, time and channels for the program, such combination of entities are meant to be included herewith within the scope of the word "broadcaster."

Turning now to the area shown generally at b, a set top box 10 is shown with storage area 11. The box 10 is connected to television receiver 15. Additionally, Internet connection means 20 is shown which may be, in this embodiment, any means as known in the art, e.g., web browser, 3G enabled wireless device, etc. Communication channel 16 is implemented between video server 5 and set top box 10. Communication channel 21 is implemented between web server 6 and Internet connection means 20. These channels are implemented using any means as is known in the art, e.g., dial-up connection, cable connection, satellite connection, other broadband connection, etc.

The broadcaster begins a bid cycle for any given program by beginning a listing process, that is by listing the program as available on the web server 6. The client uses Internet connection means 20 to browse the listings on the web server 6. Table 1 shows an example of a listings screen available to the customer. The screen lists, aside from the type and name of the program, various other program associated values:

- minimum offer price,
- bid price to be filled in by the customer,
- expiration day, date and time of the bid cycle (which, if other than live programming, may be modified as desired by the broadcaster),
- current fulfillment percentage, which indicates to the customer (and broadcaster) how much of a demand exists;
- predicted offering time, which is usually the same as the expected end time of the bid cycle. It may as well be based on the current rate of the bidding process, that is, based on how many customers have been bidding during a specified period of time; and,
- preview availability.

These program associated values are for this embodiment. Other embodiments may include other desired program associated values. Moreover, the type of listing of any program associated value may differ in other embodiments. For example, a minimum offer price value may not be established for programs in some embodiments, thus leaving it to customers to bid any price desired. For example, other program associated values such as current number of bids, average bid price, etc. may be shown as well. It should also be noted that some of the program associated values are dynamic, that is, they will change during the period of their associated program's listing, in this and other embodiments, as will be further described below.

When the customer sees a program she desires to watch, she initiates a request process by entering a bid amount for the desired program. The bid amount needs to be equal to or greater than the minimum amount, in this embodiment, to be accepted by the programmer. It should be noted that most bids will likely be at the minimum offer price. In other embodiments, the programmer may accept bids of less than the minimum amount. In the preferred embodiments, however, the programmer will set a minimum price internally, usually based on the cost and the popularity of the content.

In some embodiments, the minimum offer price may be dynamic. It may change as the program is being offered according to the customer response rate during the bidding process or other variables. For example, a rapid customer response rate for a particular program may result in decreasing the minimum offer price—and so the minimum bid price—during the bid cycle. The rapid customer response rate provides an indication to the broadcaster that customers desire the program, and so the volume of customer's responses, as indicated by the rapid response rate, will make up for any total revenue decrease occasioned by the offer price reduction. (Of course, a rapid customer response during the bidding process to any particular content would also provide the broadcaster with guidance as to the type of content to broadcast over limited channel space, that is, to maximize channel utilization.)

As another example, a slow response rate for a particular program during the bidding process may result in increasing the minimum offer price, and so the minimum bid price, during the bid cycle. A slow response rate would show the content is not in high demand and so a greater price might be needed to reach threshold value. (Additionally, the broadcaster might schedule such content on a less than premium time, so as to maximize channel utilization.)

Of course, other pricing schemes might be used as well, such as increasing the minimum bid for a program with a rapid response rate during the bidding process, decreasing the minimum bid for a program with a slow response rate to stimulate demand, etc. Any variable pricing can be done on any schedule desired, including modifying pricing for a show during a bid cycle.

Customer bids for any particular program are sent by web server 6 to host 7. Host 7 aggregates the bids for each program during the availability of the program. This is referred to herein as an aggregation process.

During the aggregation process, the aggregated bids may reach a threshold value predetermined by the broadcaster, which in this embodiment is a predetermined value related to the cost of providing the program. If the aggregated bids reach that threshold value, host 7 notifies web server 6 to stop collecting bids, and notifies video server 5 to broadcast the program to the customers. The bids are aggregated as they are received, although in other embodiments the bids may be gathered and aggregated on a schedule, and then compared to the threshold value.

Broadcast of the program initiates the broadcast process, which is concluded when the program is broadcast to all eligible customers, and the bid cycle is satisfied. It should be noted that a program once listed may be made available again after a bid cycle ends, as will be described further below. The broadcaster may make a decision to relist a program, and so begin a new bid cycle, for example, when the program has had its threshold reached in a short time, thus indicating demand for the program is high. This would enable the broadcaster to use his channels to maximum utility. In this embodiment, the broadcast of the program is to those customers that have bid on the program and thus shown demand. The price to those customers is set according to various criteria. For example, the broadcaster may set the price at a point that maximizes his profit for the broadcast. For example, the broadcaster may attempt to maximize customer satisfaction by setting a price that is no lower than the minimum offer price. Example 1 shows some alternative methods of setting a minimum offer price.

Example 1

Threshold Value is set at $40, and the minimum offer price is $4.

Bid Cycle 1 produces bids of $50, $10, $10, $10, $5, $5, $5, $5, $4, for 9 customers. The broadcaster could either:

A) Set the price at $50, 1 customer will receive the show and the broadcaster will receive $10 profit.

B) Set the price at $10, 4 customers will receive the show and the broadcaster will receive $0 profit.

C) Set the price at $5, 8 customers will receive the show and the broadcaster will receive $0 profit.

D) Set the price at $4, 9 customers will receive the show and the broadcaster will lose $4.

Therefore, if the broadcaster wishes to maximize profits in this example, it will set the price to $50 but only serve one customer. However, if it wishes to maximize customer satisfaction, it will set the price to $5. Eight customers will receive the show but there is no profit. Note here that the broadcaster may then notify the remaining bidding customer of the program's availability, and she will be offered the program at the set price ($5.00.) Thus, even after a price is set, others may be notified of the show and its price in order to attempt to maximize revenue.

In the especially preferred embodiments, each customer is charged an identical final price. Those that bid higher amounts will have a better chance of being included in the broadcast once the price has been set, however, since the set price is equal for all, the high bidder may not be charged any more than a low bidder.

In other embodiments, there may be a general broadcast to all customers, with a price set as desired, for example, at the average program bid price. Thus, in these embodiments, non bidding customers may obtain the program, as long as they are willing to pay the price. Insofar as the incremental cost of adding non bidding customers may be minimal, the provision of the program to these non bidding customers provides revenue maximization.

Returning for a moment to the broadcast process, once the video server 5 receives the broadcast notification, i.e. that the threshold value is met, it downloads the program to local storage 11 within set top box 10. (Those customers that may lack local storage are notified of the broadcast date and time in advance.)

The customer is notified the program is available through the Internet connection means 20. (Alternatively, if a broadcasting time is determined ahead of time of broadcasting, the program can also be put into a web server listing as a regular pay per view program and accepted by non bidding customers, etc.) She can then view the program. A billing process then begins, which charges the customer's account through billing system 30. In other embodiments, other local storage means as known in the art may be used, for example, an internal television storage device, a personal video recorder, etc. Those customers that have bid below the minimum offer price may also have the content downloaded to their storage. In this event, a notice may be sent by the broadcaster, notifying the customer that the content is available and can be purchased for the minimum price.

A bid cycle may be unsatisfied as well, which means that the threshold has not been met by the aggregated bids before the expiration time for the program is reached. In such an event, the broadcaster may choose to begin the program's bid cycle again, perhaps by repricing the minimum offer price for the program. Of course, the broadcaster could also choose to extend the bid cycle as well.

Returning for a moment to Table 1, other dynamic program associated values in some embodiments may be, for example, predicted offering time, which will also change as bids are received during the aggregation process. The changes in the predicted offering program associated values are not limited to modifications through aggregated bid values. For example, predicted offering time may change as the broadcaster desires, in order to stagger the use of delivery channels and so make most efficient use of channels according to the demand for programs. The programs in highest demand, i.e. with the most bids, highest value bids, etc., may be offered at premium times, and those in lesser demand may be offered at off peak times.

In some embodiments, the threshold value may be dynamic. For example, the broadcaster may, after the bid process is begun, notice the bids are accumulating at a pace that will likely not meet the value. It may then choose to adjust the threshold, to make the programming available for a broadcast process. As another example, the threshold value may vary based on broadcasting time. Prime time is generally worth more than other time. If a program is originally scheduled to be broadcast at prime time, yet accumulates few bids, it's broadcast time may be changed to a less costly or otherwise idle time, and so lower the threshold value and ultimately result in a completed bid cycle.

Information generated during the bid cycle, as well as any other desired information, is collected by the broadcaster. In the embodiment shown in FIG. 1, the processing system 35 gathers information regarding the bids, such as program, amount, time received, etc. Thus reports can be generated of the nature of the bid process, helping to further analyze pricing, availability, demand, etc., that is, establish predictive factors for future programs. Additionally, the processing system 35 may be, in some embodiments, enabled to provide new content as desired. For example, if a particular show is especially desirable, and has satisfied its bid cycle rapidly, other similar content may be found through the media distribution network and placed on line by a processing system. Thus, the broadcaster can maximize revenue from a currently "hot" program area.

Other embodiments of the present invention may be used to determine a demand for creating program. That is, proposed programming may be set forth by the broadcaster and customers may bid on whether they would receive the program. If enough aggregated bids are received to meet a threshold value, the broadcaster will create the program, enter into a broadcast and billing process, etc.

Although the terminology used above with regard to disseminating content has generally been that of the television industry, it should be noted that embodiments may be used in any industry involved in disseminating content, which is how the term "broadcasting" is to be defined herein. For example, embodiments may be used to disseminate media over the Internet, media over a network, multimedia presentations, music, radio broadcasting and the word "program" is intended herein to include any such content.

Additionally, the terminology used above with regard to the customer interface has generally used Web terminology, and, in the preferred embodiments, transfers are made using XML. However, it should be specifically understood that embodiments can be implemented in environments that support GUI and other interfaces, as well as any known data transfer language and/or protocol, including but not limited to Microsoft Windows® XP, NT, Windows® 2000, Windows® 95, 98 and Me, Unix® and Unix®-like platforms which include but are not limited to Linux® and its variants, as well as other operating system platforms including but not limited to IBM OS/390, MacOS, VxWorks® and others.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. A method for a server to transmit broadcast programming multimedia content, by a broadcaster, comprising the steps of:

using said server to start a bid cycle by providing a notification, via a first communication channel, of at least one available program for transmission over a broadcast channel;

receiving at said server at least two bids above a minimum offer price from different parties for said at least one available program;

aggregating, via a host within a broadcast system, all of said bids received to establish an aggregate bid value;

comparing said aggregate bid value to a broadcaster determined threshold value;

adjusting a length of the bid cycle and the threshold value in response to a response rate of bids such that time of the bid cycle is shortened and the threshold price is increased when said response rate is high and said bid cycle is lengthened and the threshold price is lowered when said response rate is low, ending said bid cycle and transmitting via said server said at least one available program to said different parties, with respective bids equal to or above said minimum offer price, if said aggregate bid value is at least equal to said threshold value;

billing the parties for the program according to their respective bid price, if said bid price was equal to or above said minimum offer price;

offering said at least one program to a non-bidding party at an average program bid price calculated from the aggregative bid value divided by the numbers of parties being billed in the previous step;

transmitting said at least one program to said non-bidding party when said non-bidding party pays said average program bid price.

2. A method as in claim 1, wherein the step of broadcasting said program if said aggregate bid value is at least equal to said threshold value further comprises broadcasting said program to a local storage means.

3. A method as in claim 1 further comprising the step of establishing a threshold value for a multimedia program.

4. A method as in claim 3, wherein the step establishing a threshold value for a multimedia program further comprises the step of using predetermined criteria to establish a threshold value.

5. A method as in claim 1 further comprising the step of soliciting at least one bid for said program during said bid cycle.

6. A method as in claim 1, further comprising the step of establishing a broadcast time.

7. A method as in claim 6, further comprising the step of providing notification of said broadcast time.

8. A method for maximizing channel utilization by a broadcaster comprising:

providing at least two broadcast channels;

selecting content for those channels by performing the following steps:

establishing a broadcaster determined threshold value for each program selected from a group of predetermined content;

soliciting a bid at a web server using a processor for each of said programs during a bid cycle;

receiving at said server at least two bids above a minimum offer price from different parties for each of said programs during said bid cycle;

aggregating, via a host within a broadcast system, all of said bids received for each program to establish an aggregate bid value for each program;

comparing said aggregate bid for each of said programs to said threshold value for said program;

adjusting a length of the bid cycle and the threshold value in response to a response rate of bids such that time of the bid cycle is shortened and the threshold price is increased when said response rate is high and said bid cycle is lengthened and the threshold price is lowered when said response rate is low, ending said bid cycle and transmitting via said server said at least one available program to said different parties, with respective bids equal to or above said minimum offer price, if said aggregate bid value is at least equal to said threshold value;

billing the parties for the program according to their respective bid price, if said bid price was equal to or above said minimum offer price;

offering said at least one program to a non-bidding party at an average program bid price calculated from the aggregative bid value divided by the numbers of parties being billed in the previous step;

transmitting programs over said at least two broadcast channels using a video server when an aggregate bid for a corresponding program is above a threshold, said transmission is initiated with information from said web server.

* * * * *